United States Patent Office 3,314,974
Patented Apr. 18, 1967

3,314,974
THIENYL-1-NAPHTHALENE ACETIC ACIDS
AND RELATED COMPOUNDS
James S. Kaltenbronn, Ann Arbor, Mich., assignor to Parke, Davis & Company, Detroit, Mich., a corporation of Michigan
No Drawing. Filed May 12, 1966, Ser. No. 549,439
6 Claims. (Cl. 260—332.2)

This application is a continuation-in-part of my copending application Ser. No. 455, 623, filed May 13, 1965.

The present invention relates to new 4- and 5-thienyl-1-napthaleneacetic acids and to salts and esters thereof. More particularly, the invention relates to compounds, having the formula,

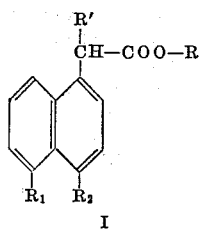
I and to methods for their production; where R represents hydrogen, a salt-forming cation, a lower alkyl radical, or a lower dialkylaminoalkyl radical; R' represents hydrogen or a lower alkyl radical; one of $R_1$ and $R_2$ represent hydrogen; and the other of $R_1$ and $R_2$ represents a 2-thienyl substituent, having the formula,

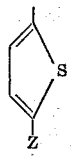

or a 3-thienyl substituent, having the formula,

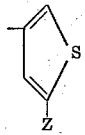

where Z represents hydrogen, bromine, or chlorine. The lower dialkylaminoalkyl radical can be present in free base or acid-addition salt form.

In the foregoing formula the lower alkyl radicals are preferably those containing not more than four carbon atoms. The lower dialkylaminoalkyl radicals which can be represented by the formula, —alkylene—N(lower alkyl)(lower alkyl)

are preferably those in which each lower alkyl group contains not more than four carbon atoms, and the alkylene group contains not more than four carbon atoms, separating the groups to which it is attached by at least two carbon atoms.

In accordance with the invention, compounds having the formula

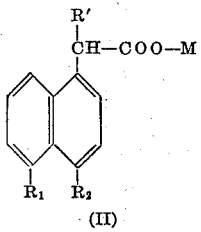
(II)

are produced by the hydrolysis of a compound having the formula

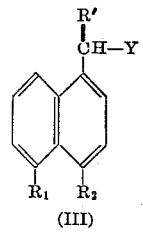
(III)

where R', $R_1$ and $R_2$ are as earlier defined; M is hydrogen or a salt-forming cation; and Y is a group hydrolyzable to a carboxyl group. Some examples of groups hydrolyzable to a carboxyl group are cyano, alkoxycarbonyl, aryloxycarbonyl, aralkoxycarbonyl, carbamoyl, alkyl-substituted carbamoyl, trihalomethyl, amidino, alkyl-substituted amidino, haloformyl,

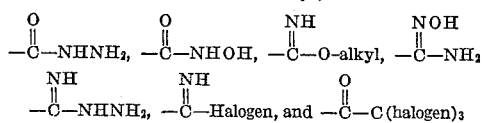

The precise nature of the group Y which is hydrolyzable to a carboxyl group is not critical because in carrying out the process it is converted to a carboxyl group. Therefore, if desired, the group Y can in appropriate cases contain one or more substituents such as lower alkyl, lower alkoxy, halogen, nitro, carboxy, or alkoxycarbonyl, and in those cases where the group Y is basic, it can also be employed in the form of an acid-addition salt. As used herein the term "group hydrolyzable to a carboxyl group" designates substituted as well as unsubstituted radicals. Compounds in which the group Y is the cyano group are preferred starting materials in the process because they are quite readily available and are hydrolyzable to the carboxyl derivatives in high yields.

The hydrolysis can be carried out under either acidic or alkaline conditions, by the use of an acidic or basic hydrolytic agent. Alkaline conditions are preferred and should be used exclusively with certain of the Y groups, for example, with the

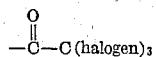

group. The hydrolysis can be carried out in water or in an aqueous solution of an unreactive, water miscible, organic solvent such as an aliphatic alcohol, dioxane, tetrahydrofuran, ethylene glycol, propylene glycol or a lower alkyl ether of ethylene glycol or of diethylene glycol, to which has been added an acid or a base to render the medium acidic or alkaline. Some examples of suitable bases are alkali metal hydroxides, alkaline earth metal hydroxides, alkali metal carbonates, alkali metal alkoxides, and trialkylammonium hydroxides. Some examples of suitable acids are mineral acids, strong organic acids such a p-toluenesulfonic acid, and acidic ion exchange resins. Preferred agents are alkali metal hydroxides such as sodium hydroxide or potassium hydroxide. The hydrolytic agent is normally employed in a considerable excess.

The hydrolysis is carried out by heating a solution or suspension of the starting material in a solvent medium containing an acid or a base until hydrolysis of the group Y is substantially complete. The required time and temperature naturally vary with the specific group Y and the basic or acidic agent used. However, in general, the reaction is carried out at a temperature between about 30–200° C., or at the reflux temperature of the solvent, with a reaction time of from 1–48 hours. When using one of the preferred basic hydrolytic agents the reaction is usually carried out at a temperature between 60–125° C., and is substantially complete within less than 24 hours. When the hydrolysis is carried out under alkaline conditions, the product is present in the reaction mixture in the form of a salt; and it can be isolated in this form or, following treatment with an acid, preferably a mineral acid, it can be isolated as the free acid. When the hydrolysis is carried out under acidic conditions, the product is present in the reaction mixture as the free acid and it can be isolated directly in this form or, by subsequent treatment with a base, it can be isolated in salt form.

Starting materials required for use in the foregoing process can be prepared by a variety of methods as illustrated in greater detail hereinafter. For example, a 4- or 5-(2-thienyl)-1-methylnaphthalene is reacted with N-bromosuccinimide to produce a 4- or 5-(5-bromo-2-thienyl)-1-bromomethylnaphthalene, and the latter compound is converted by reaction with sodium cyanide to a 4- or 5-(5-bromo-2-thienyl)-1-naphthylacetonitrile.

Also in accordance with the invention, compounds having the formula

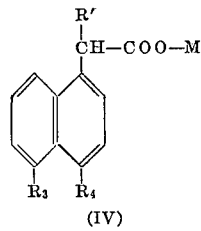

(IV)

are produced by the reductive dehalogenation of a compound having the formula

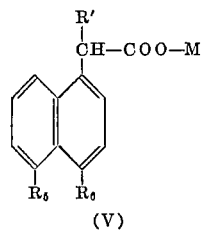

(V)

where R' and M have the aforementioned significance; one of $R_3$ and $R_4$ is hydrogen; the other of $R_3$ and $R_4$ is 2-thienyl or 3-thienyl; one of $R_5$ and $R_6$ represents hydrogen; and the other of $R_5$ and $R_6$ represents a 5-halo-2-thienyl substituent, having the formula,

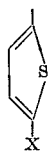

or a 5-halo-3-thienyl substituent, having the formula

where X is bromine or chlorine. The reductive dehalogenation may be accomplished catalytically or by the action of a chemical reducing agent. Some examples of chemical reducing agents that may be employed are a copper-zinc couple in ethanol, zinc and hydrochloric acid, sodium amalgam in ethanol, and aluminum amalgam in ethanol. The preferred method for the reductive dehalogenation is the catalytic method employing gaseous hydrogen and a hydrogenation catalyst, which is preferably palladium on charcoal. The catalytic reductive dehalogenation is preferably carried out in the presence of a base, such as sodium acetate, employed in an amount sufficient to bind the hydrogen halide liberated. Suitable solvents that may be employed in the catalytic reduction include water, for reduction of the compounds of formula V where M is a salt-forming cation; lower alkanols, preferably ethanol; acetic acid; ethers, such as dioxane and tetrahydrofuran; N,N-dimethylformamide; and mixtures of these. The catalytic reduction is ordinarily carried out at a temperature in the range of 20–75° C., employing hydrogen pressures of from one to 4 atmospheres. Temperatures and pressures somewhat outside these ranges may also be employed. When a chemical reducing agent is employed, it is preferable to use a slight excess of the reducing agent, although approximately equivalent amounts of reactants may also be used. When the reductive dehalogenation is accomplished catalytically, the reaction is allowed to proceed until the required amount of hydrogen is taken up.

Further in accordance with the invention, compounds having the formula

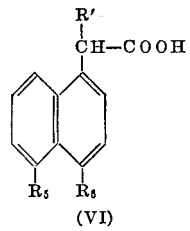

(VI)

are produced by the reaction of a compound having the formula

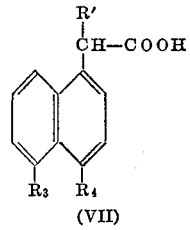

(VII)

with a halogenating agent in an unreactive solvent medium; where R', $R_3$, $R_4$, $R_5$, and $R_6$ all have the aforementioned significance. Halogenating agents that may be employed are bromine or N-bromosuccinimide for bromination and chlorine or sulfuryl chloride for chlorination. Suitable unreactive solvents that may be used in this reaction include acetic acid and carbon tetrachloride. The temperature and duration of the reaction are not critical and may be varied over a wide range. It is most convenient to carry out the reaction at the reflux temperature of the solvent employed for a period of several hours or until monohalogenation is complete. Approximately equivalent quantities of reactants are normally employed, although a slight excess of the halogenating agent is not harmful.

Also in accordance with the invention, compounds having the formula

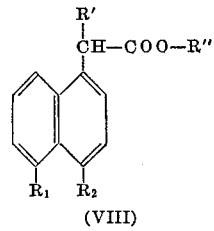

(VIII)

are produced by reacting a compound having the formula

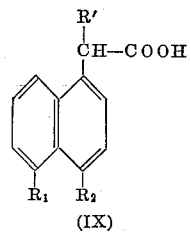

(IX)

or a reactive derivative thereof with a lower alkanol, a lower dialkylaminoalkanol, or a reactive derivative of these; where R″ is lower alkyl or lower dialkylaminoalkyl and R′, $R_1$, $R_2$ are as defined previously. The lower alkanol, lower dialkylaminoalkanol, and their reactive derivatives serve as esterifying agents. Some examples of suitable reactive derivatives of the acid are the acid anhydride, acid halides, and alkali metal salts of the acid. Some examples of suitable reactive derivatives of the alkanols are various esters such as methyl bromide, methyl iodide, ethyl iodide, propyl iodide, dimethyl sulfate, diethyl sulfate, 2-diethylaminoethyl chloride, 2-dipropylaminoethyl chloride, and 3-diethylaminopropyl bromide. Other reactive derivatives such as diazomethane can also be used.

When the esterifying agent is a lower alkanol or a lower dialkylaminoalkanol, the process is preferably carried out by heating the free acid or the anhydride or halide with an excess of the lower alkanol or lower dialkylaminoalkanol. An acidic catalyst such as hydrogen chloride, sulfuric acid, or benzenesulfonic acid is used when the free acid or the anhydride is one of the reactants. Additional solvents such as tetrahydrofuran, benzene, dioxane or diethylene glycol dimethyl ether may be present but are not necessary. The reaction is commonly carried out at a temperature of about 25° C. or higher, preferably at 60–150° C. but not higher than the reflux temperature, and is normally completed within 5 to 100 hours with the free acid or within 1 to 5 hours with the anhydride or a halide.

When the esterifying agent is an ester of a lower alkanol or an ester of a lower dialkylaminoalkanol as illustrated above, the process is preferably carried out by heating the acid or salt thereof with the selected halide, sulfate, or other ester derivative in a solvent in the presence of a base. Some examples of suitable solvents are lower alkanols, tetrahydrofuran, dioxane, dimethylformamide, diethylene glycol dimethyl ether, and mixtures thereof. Some examples of suitable bases are inorganic alkalies and tertiary organic amines. At least one equivalent and preferably an excess of the esterifying agent is used. The reaction is usually carried out at a temperature from 25–150° C., preferably from 50–100° C., and under these conditions it is substantially complete within one hour.

When the esterifying agent is diazomethane, the process is preferably carried out in an unreactive solvent such as ether, tetrahydrofuran, diethylene glycol dimethyl ether or dioxane. The reaction proceeds very rapidly and is preferably carried out by treating the free acid with one equivalent or a slight excess of diazomethane at 0 to 25° C., under which conditions the esterification is complete within less than 5 minutes.

In the case of the production of the lower dialkylaminoalkyl esters of the invention, the product can be isolated, by pH adjustment, either as the free base or as an acid-addition salt.

The free acids and the free bases of the invention form salts with a variety of organic or inorganic bases or acids. Some examples of suitable bases are sodium hydroxide, potassium hydroxide, calcium hydroxide, aluminum hydroxide, sodium carbonate, potassium bicarbonate, choline, 2-hydroxyethylamine, ammonia, and diethylamine. Some examples of suitable acids are hydrochloric acid, hydrobromic acid, sulfuric acid, phosphoric acid, acetic acid, citric acid, tartaric acid and sulfamic acid. The preferred carboxylate salts of the invention are the pharmaceutically-acceptable salts of an alkali metal, an alkaline earth metal, ammonia, or a substituted ammonia. Preferred acid-addition salts of the invention are the mineral acid salts. The carboxylate salts and acid-addition salts with pharmaceutically-acceptable cations and anions differ in solubility properties from the free acids and free bases but are otherwise equivalent for the purposes of the invention.

The compounds of the invention are new chemical compounds that are useful as pharmacological agents. They are anti-inflammatory agents that can be used in the relief of inflammatory conditions as well as in the prevention or suppression of the occurrence of inflammation. They are preferably administered by the oral route although parenteral administration can also be used. The compounds of the invention can be employed in either free acid, ester, or salt form, and can be combined with either a solid or liquid carrier or diluent and made available in varying amounts in such pharmaceutical forms as tablets, capsules, powders and aqueous and non-aqueous suspensions and solutions.

The invention is illustrated by the following examples:

EXAMPLE 1

A solution of 100 g. of potassium hydroxide in 200 ml. of water is added to a solution of 109.8 g. of 4-(5-bromo-2-thienyl)-1-naphthylacetonitrile in 750 ml. of ethanol and 250 ml. of dioxane, and the resulting solution is heated under reflux for 16 hours. The solution is concentrated to near-dryness under reduced pressure, the residue to dissolved in water, and the aqueous solution is extracted twice with ether and acidified with dilute hydrochloric acid. The oil obtained is extracted with ether, and the ethereal solution is washed with water, dried over anhydrous sodium sulfate, and evaporated to dryness under reduced pressure. The 4-(5-bromo-2-thienyl)-1-naphthaleneacetic acid thus obtained is purified by chromatography on silica gel and crystallization from cyclohexane-benzene; M.P. 138.5–140.5° C.

To a solution of 6.94 g. of 4-(5-bromo-2-thienyl)-1-naphthaleneacetic acid in 50 ml. of methanol is added in portions 1.06 g. of sodium carbonate. The mixture is heated under reflux for 30 minutes, and then evaporated to dryness under reduced pressure to give 4-(5-bromo-2-thienyl)-1-naphthaleneacetic acid sodium salt as a white powder.

A solution of 2.79 g. of choline chloride in 10 ml. of methanol is added to 7.38 g. of 4-(5-bromo-2-thienyl)-1-naphthaleneacetic acid sodium salt in 75 ml. of methanol. The mixture is stirred for one hour, the insoluble sodium chloride is removed by filtration, and the filtrate is evaporated to dryness under reduced pressure to give 4-(5-bromo-2-thienyl)-1-naphthaleneacetic acid choline salt as a white solid.

The 4-(5-bromo-2-thienyl)-1-naphthylacetonitrile used as starting material in the foregoing procedure is prepared according to the following procedure. Magnesium (7.2 g.) is reacted with 49.5 g. of 2-bromothiophene and a crystal of iodine in 125 ml. of ether. A solution of 45.0 g. of 1-oxo-4-methyl-1,2,3,4-tetrahydronaphthalene in 100 ml. of ether is then added dropwise, and the mixture is stirred at room temperature overnight and hydrolyzed with water and dilute hydrochloric acid. The product recovered from the ether solution is dissolved in 100 ml. of acetic anhydride, and this solution is heated under reflux for one hour, poured into water, and the aqueous mixture extracted with ether. The ether solution is washed with 5% aqueous sodium hydroxide until the wash is basic and then with water until neutral. Evaporation of the dried ether solution gives 4-(2-thienyl)-1-methyl-1,2-dihydronaphthalene. This product (57.6 g.) is dissolved in 100 ml. of xylene, 25 ml. of nitrobenzene and 15 g. of 6% palladium on charcoal are added, and the mixture is heated under reflux under a water separator for 100 hours. After removal of the solvent under reduced pressure, the residue is dissolved in 200 ml. of ethanol; 20 ml. of acetic acid and 20 g. of Girard's T reagent are added and the solution is heated under reflux for 30 minutes. The solvent is removed under reduced pressure, the residue is dissolved in ether, and the ether solution is washed with water, saturated aqueous sodium bicarbonate, and with water against until neutral. Evaporation of the dried ether solution gives 4-(2-thienyl)-1-methylnaphthalene; B.P. 119–170° C./0.2 mm. Hg. To a solution of 25.8 g. of this product in 200 ml. of carbon tetrachloride is added 20.7 g. of N-bromosuccinimide and 100 mg. of dibenzoyl-peroxide, and the mixture is heated under reflux for 3 hours while being irradiated with a floodlight. The mixture is then filtered, washed with 5% aqueous sodium hydroxide and with water, dried, and evaporated under reduced pressure to give 4-(5-bromo-2-thienyl)-1-methylnaphthalene; B.P. 195–205° C./0.5 mm. Hg. This product (21.0 g.) is further brominated by reaction with N-bromosuccinimide (12.5 g.) as above to give 4-(5-bromo-2-thienyl)-1-bromomethylnaphthalene. A solution of 24.3 g. of this bromomethyl compound in 100 ml. of acetone and 100 ml. of ethanol is treated with 3.12 g. of sodium cyanide in 20 ml. of water, and the solution is heated under reflux for 4 hours. The solvent is removed under reduced pressure, the residue is dissolved in ether, and the ethereal solution is washed with water, dried, and evaporated to give 4-(5-bromo-2-thienyl)-1-naphthyl-acetonitrile, suitable for use without further purification.

EXAMPLE 2

A solution of 200 g. of potassium hydroxide in 300 ml. of water is added to a solution of 197.1 g. of 5-(5-bromo-2-thienyl)-1-naphthylacetonitrile in 1500 ml. of ethanol and 500 ml. of dioxane, and the resulting solution is heated under reflux overnight. The solvent is evaporated under reduced pressure, the residue is dissolved in water, and the aqueous solution is extracted twice with ether and acidified with dilute hydrochloric acid. The oil obtained is extracted with ether-ethyl acetate, and the organic solution is washed with water, dried, and evaporated to dryness under reduced pressure to give 5-(5-bromo-2-thienyl)-1-naphthaleneacetic acid; M.P. 148–149.5°C., following purification by chromatography on silica gel and two crystallizations from benzene-hexane.

A solution of 1.5 g. of ammonia in 10 ml. of methanol is added to a solution of 6.9 g. of 5-(5-bromo-2-thienyl)-1-naphthaleneacetic acid in 50 ml. of methanol and the mixture is evaporated to dryness to give 5-(5-bromo-2-thienyl)-1-naphthaleneacetic acid ammonium salt as a white solid. The diethylamine salt is prepared similarly by substituting 3.0 g. of diethylamine for the ammonia.

The 5-(5-bromo-2-thienyl)-1-naphthylacetonitrile used as starting material in the foregoing procedure is prepared from 2-bromothiophene and 1-oxo-5-methyl-1,2,3,4-tetrahydronaphthalene according to the procedure given in Example 1 above for the preparation of 4-(5-bromo-2-thienyl)-1-naphthylacetonitrile.

EXAMPLE 3

A solution of 57.4 g. of potassium hydroxide in 150 ml. of water is added to a solution of 57.4 g. of 4-(5-bromo-3-thienyl)-1-naphthylacetonitrile in 500 ml. of ethanol, and the resulting solution is heated under reflux for 18 hours. The solution is concentrated to near-dryness under reduced pressure, the residue is dissolved in water, and the aqueous solution is extracted twice with ether and acidified with dilute hydrochloric acid. The oil obtained is extracted into ether, and the ethereal solution is washed with water, dried, and evaporated to dryness under reduced pressure. The 4-(5-bromo-3-thienyl)-1-naphthaleneacetic acid thus obtained is purified by chromatography on silica gel and crystallization from benzene-hexane; M.P. 156–159° C.

In the foregoing procedure, with the substitution of 5-(5-bromo-3-thienyl)-1-naphthylacetonitrile for the 4-(5-bromo-3-thienyl)-1-naphthylacetonitrile, there is obtained 5-(5-bromo-3-thienyl)-1-naphthaleneacetic acid.

To a solution of 6.94 g. of 4-(5-bromo-3-thienyl)-1-naphthaleneacetic acid in 50 ml. of methanol is added, in portions, 1.38 g. of potassium carbonate. The mixture is heated under reflux for 30 minutes, and then evaporated to dryness under reduced pressure to give 4-(5-bromo-3-thienyl)-1-naphthaleneacetic acid potassium salt as a white powder.

The 4-(5-bromo-3-thienyl)-1-naphthylacetonitrile used as starting material in the foregoing procedure is prepared as follows. Lithium (5.96 g.) is reacted with n-butyl bromide (64.9 g.) in 500 ml. of ether at −20° C. After two hours at −20° C., the stirred mixture is cooled to −70° C., and a solution of 50.0 g. of 3-bromothiophene in 100 ml. of ether, cooled to −70° C., is added in a steady stream. After 10 minutes of stirring at −70° C., a solution of 68.8 g. of 1-oxo-4-methyl-1,2,3,4-tetrahydronaphthalene in 150 ml. of ether is added in a steady stream, and the resulting mixture is stirred at room temperature overnight and hydrolyzed with dilute hydrochloric acid. The oily product recovered from the ether solution is dissolved in 150 ml. of acetic anhydride, and this solution is heated under reflux for one hour, poured onto ice, and the aqueous mixture treated with 50% aqueous sodium hydroxide. The alkaline mixture is extracted with ether, and the ether solution is washed with water until neutral, dried, and evaporated. The oily residue is dissolved in 200 ml. of ethanol, 20 g. of Girard's T reagent and 20 ml. of acetic acid are added, and the solution is heated under reflux for 30 minutes. The solvent is removed under reduced pressure, and the residue is again dissolved in ether. The ether solution is washed with water, with saturated aqueous sodium bicarbonate, and with water again until neutral, dried, and evaporated to dryness to give 4-(3-thienyl)-1-methyl-1,2-dihydro-naphthalene, obtained as a dark oil. This product is converted to 4-(5-bromo-3-thienyl)-1-naphthylacetonitrile by the series of reactions described in Example 1 above for the conversion of 4-(2-thienyl)-1-methyl-1,2-dihydronaphthalene to 4-(5-bromo-2-thienyl)-1-naphthylacetonitrile.

In a similar manner 5-(5-bromo-3-thienyl)-1-naphthyl-acetonitrile is prepared starting from 3-bromo-thiophene and 1-oxo-5-methyl-1,2,3,4-tetrahydronaphthalene.

EXAMPLE 4

A solution of 30 g. of potassium hydroxide in 75 ml. of water is added to a solution of 30.0 g. of 5-(2-thienyl)-1-naphthylacetonitrile in 300 ml. of ethanol, and the resulting solution is heated under reflux for 16 hours and then evaporated under reduced pressure. The residue is dissolved in water, and the aqueous solution is extracted twice with ether and acidified with dilute hydrochloric acid. The solid 5-(2-thienyl)-1-naphthaleneacetic acid that precipitates is isolated, dried, and crystallized several times from benzene-hexane; M.P. 151.5–152.5° C.

In the foregoing procedure, with the substitution of 4-(2-thienyl)-1-naphthylacetonitrile for the 5-(2-thienyl)-1-naphthylacetonitrile, there is obtained 4-(2-thienyl)-1-naphthaleneacetic acid; M.P. 166–168° C., following crystallization from acetonitrile.

The starting materials can be obtained as follows. A mixture consisting of 44 g. of 5-(5-bromo-2-thienyl)-1-naphthylacetonitrile, 11 g. of sodium acetate, 4.0 g. of 20% palladium on charcoal, and 500 ml. of 95% ethanol is shaken at room temperature with hydrogen at a pressure of 50 lbs./in.$^2$ until a molar equivalent of hydrogen is absorbed. The mixture is then filtered, and the filtrate is evaporated under reduced pressure to give 5-(2-thienyl)-1-naphthylacetonitrile, suitable for use without further purification. 4-(2-thienyl)-1-naphthylacetonitrile is prepared in an analogous manner from the reductive dehalogenation of 4-(5-bromo-2-thienyl)-1-naphthyl-acetonitrile.

EXAMPLE 5

A solution of 10 g. of potassium hydroxide in 50 ml. of water is added to a solution of 10 g. of 4-(3-thienyl)-1-naphthylacetonitrile in 100 ml. of ethanol, and the resulting solution is heated under reflux for 18 hours and then evaporated under reduced pressure. The residue is dissolved in water, and the aqueous solution is extracted twice with ether and acidified with dilute hydrochloric acid. The solid 4-(3-thienyl)-1-naphthaleneacetic acid that precipitates is isolated, dried, and crystallized several times from ethanol-water; M.P. 119.5° C.–121.5° C.

In the foregoing procedure, with the substitution of 5-(3-thienyl)-1-naphthylacetonitrile for the 4-(3-thienyl)-1-naphthylacetonitrile, there is obtained 5-(3-thienyl)-1-naphthaleneacetic acid.

The starting materials can be obtained by the reductive dehalogenation of 4- and 5-(5-bromo-3-thienyl)-1-naphthylacetonitrile according to the procedure described in Example 4 above for the reductive dehalogenation of 5-(5-bromo-2-thienyl)-1-naphthylacetonitrile.

EXAMPLE 6

A solution of 25 g. of potassium hydroxide in 50 ml. of water is added to a solution of 20.0 g. of 5-(5-chloro-2-thienyl)-1-naphthylacetonitrile in 200 ml. of ethanol, and the resulting solution is heated under reflux for 16 hours and then evaporated under reduced pressure. The residue is dissolved in water, and the aqueous solution is extracted twice with ether and acidified with dilute hydrochloric acid. The solid 5-(5-chloro-2-thienyl)-1-naphthaleneacetic acid that precipitates is isolated, dried, and crystallized several times from cyclohexane; M.P. 138–140° C.

The starting material is obtained as follows. A solution of 24.9 g. of 5-(2-thienyl)-1-naphthylacetonitrile in 250 ml. of acetic acid is kept below 35° C. and irradiated with a floodlamp while 7.5 g. of chlorine gas is bubbled into it, and the resulting solution is irradiated at room temperature for one hour more. It is then poured into water, and the aqueous mixture is made slightly basic with dilute aqueous sodium hydroxide and extracted with ether. The ethereal extract is washed with water, dried, and evaporated under pressure to give 5-(5-chloro-2-thienyl)-1-naphthylacetonitrile, suitable for use without further purification.

EXAMPLE 7

A mixture consisting of 10 g. of the ethyl ester of 4-(5-bromo-2-thienyl)-1-naphthaleneacetic acid, 10 g. of potassium hydroxide, 25 ml. of water, and 100 ml. of ethanol is heated under reflux for four hours, and concentrated to a small volume under reduced pressure. The residue is diluted with water, and the aqueous mixture is extracted twice with ether and acidified with dilute hydrochloric acid. The acidic aqueous mixture is extracted with ether, and the ethereal solution is washed with water, dried, and evaporated under reduced pressure. The 4-(5-bromo-2-thienyl)-1-naphthaleneacetic acid thus obtained is purified by chromatography on silica gel and crystallization from cyclohexane-benzene; M.P. 138.5–140.5° C.

The same product is obtained by the substitution of the ethyl ester of 4-(5-bromo-2-thienyl)-1-naphthaleneacetimidic acid hydrobromide in the foregoing procedure.

In the foregoing procedure, with the substitution of the ethyl ester of 5-(5-bromo-2-thienyl)-1-naphthaleneacetic acid or the ethyl ester of 5-(5-bromo-2-thienyl)-1-naphthaleneacetimidic acid hydrobromide, there is obtained 5-(5-bromo-2-thienyl)-1-naphthaleneacetic acid.

The starting materials can be obtained as follows. A solution of 10 g. of 4-(5-bromo-thienyl)-1-naphthylacetonitrile in 100 ml. of ether containing 1.45 g. of ethanol is cooled to —15° C. and treated with gaseous hydrogen bromide until the desired iminoether (ethyl ester of 4-(5-bromo-2-thienyl)-1-naphthaleneacetimidic acid hydrobromide) precipitates. The crude product is isolated and dried. A solution of 5 g. of the iminoether hydrobromide in 25 ml. of cold water is allowed to stand for several minutes and is then extracted with benzene. The benzene extract is washed with saturated sodium bicarbonate and with water, dried, and evaporated under reduced pressure to give the ethyl ester of 4-(5-bromo-2-thienyl)-1-naphthaleneacetic acid, suitable for use without further purification. The isomeric ethyl ester of 5-(5-bromo-2-thienyl)-1-naphthaleneacetimidic acid hydrobromide and ethyl ester of 5-(5-bromo-2-thienyl)-1-naphthaleneacetic acid are obtained in a similar manner.

EXAMPLE 8

A mixture of 10 g. of 4-(5-bromo-2-thienyl)-1-naphthaleneacetamide, 8 g. of sodium hydroxide, 30 ml. of water and 120 ml. of ethanol is heated under reflux for six hours, concentrated to a small volume by distillation, and the residue diluted with water. The aqueous mixture is extracted twice with ether and acidified with dilute hydrochloric acid. The acidic mixture is extracted with ether, and the ethereal solution is washed with water, dried, and evaporated under reduced pressure. The 4-(5-bromo-2-thienyl)-1-naphthaleneacetic acid thus obtained is purified by chromatography on silica gel and crystallization from cyclohexane-benzene; M.P. 138.5–140.5° C.

The same product can be obtained by the substitution of the hydrazide of 4-(5-bromo-thienyl)-1-naphthaleneacetic acid in the foregoing procedure.

The starting materials can be obtained as follows. A solution of 5 g. of the ethyl ester of 4-(5-bromo-2-thienyl)-1-naphthaleneacetimidic acid hydrobromide in 50 ml. of acetone is heated under reflux for 30 minutes and then evaporated under reduced pressure to give 4-(5-bromo-2-thienyl)-1-naphthaleneacetamide.

A mixture of 10 g. of the ethyl ester of 4-(5-bromo-2-thienyl)-1-naphthaleneacetic acid, 5 g. of 85% hydrazine hydrate and 40 ml. of ethanol is heated under reflux for four hours, concentrated to half-volume under reduced pressure, cooled, and the precipitated hydrazide of 4-(5-bromo-2-thienyl)-1-naphthaleneacetic acid is collected and dried.

EXAMPLE 9

A mixture consisting of 10 g. of 4-(5-bromo-2-thienyl)-1-naphthalenacetamidine, 10 g. of potassium hydroxide, 30 ml. of water, and 125 ml. of ethanol is heated under reflux for four hours, concentrated to a small volume under reduced pressure, and the residue diluted with water. The aqueous mixture is extracted twice with ether and acidified with dilute hydrochloric acid. The acidic mixture is extracted with ether, and the ethereal solution is washed with water, dried, and evaporated under reduced pressure. The 4-(5-bromo-2-thienyl)-1-naphthalene-acetic acid thus obtained is purified by chromatography on silica gel and crystallization from cyclohexane-benzene; M.P. 138.5–140.5° C.

The starting material can be obtained as follows. A solution of 15 g. of the ethyl ester of 4-(5-bromo-2-thienyl)-1-naphthaleneacetimidic acid in 100 ml. of 75% ethanol containing 2.2 g. of ammonium chloride is heated at 70° C. for four hours and diluted with acetone to precipitate ammonium chloride, which is removed by filtration. The filtrate is diluted with a further quantity of acetone and cooled at 0° C. for several hours. The insoluble 4-(5-bromo-2-thienyl)-1-naphthaleneacetamidinehydrochloride that separates is isolated and dried. The free base is obtained by neutralization.

EXAMPLE 10

A solution of 10 g. of 4-(5-bromo-2-thienyl)-1-naphthaleneacetamide, 100 ml. of diethylene glycol dimethyl ether, and 50 ml. of concentrated hydrochloric acid is heated at 100° C. for ten hours, cooled, and diluted with water. The insoluble product is isolated, dissolved in aqueous sodium bicarbonate, and the basic solution is filtered. The filtrate is acidified with dilute hydrochloric acid, and the precipitated 4-(5-bromo-2-thienyl)-1-naphthaleneacetic acid is isolated, dried, and crystallized from cyclohexane-benzene; M.P. 138.5–140.5° C.

The same product is obtained by the substitution of the hydrazide or ethyl ester of 4-(5-bromo-2-thienyl)-1-naphthaleneacetic acid in the foregoing procedure.

EXAMPLE 11

A solution of 5 g. of potassium hydroxide in 15 ml. of water is added to a solution of 5.0 g. of the ethyl ester of α-methyl-4-(2-thienyl)-1-naphthaleneacetic acid, and the resulting solution is heated under reflux for three hours and concentrated under reduced pressure. The residue is diluted with water, and the aqueous mixture is extracted with ether and acidified with dilute hydrochloric acid. The solid α-methyl-4-(2-thienyl)-1-naphthaleneacetic acid that precipitates is isolated and dried; M.P. 128.5–129° C., following crystallization from methanol-water.

By utilizing the foregoing procedure, with the substitution of 5.0 g. of the methyl ester of α-methyl-4-(3-thienyl)-1-naphthaleneacetic acid for the ethyl ester of α-methyl-4-(2-thienyl)-1-naphthaleneacetic acid, there is obtained α-methyl-4-(3-thienyl)-1-naphthaleneacetic acid.

The starting materials can be obtained as follows. A solution of 6.1 g. of the ethyl ester of 4-(2-thienyl)-1-naphthaleneacetic acid in 15 ml. of dimethylsulfoxide is added dropwise with stirring to a mixture consisting of 1.15 g. of a 51.6% dispersion of sodium hydride in mineral oil and 10 ml. of dimethylsulfoxide kept at a temperature between 15 and 25° C. in a nitrogen atmosphere. The red reaction mixture is stirred at room temperature for 6 hours more, and 7.1 g. of methyl iodide is then added with stirring and cooling to maintain the temperature below 25° C. After stirring at room temperature for an additional two hours, the excess hydride is decomposed by the cautious addition of dilute aqueous acetic acid, and the mixture is extracted with several portions of ether. The ethereal extract is washed with saturated aqueous sodium bicarbonate and with water, dried, and evaporated under reduced pressure to give a residue of the ethyl ester of α-methyl-4-(2-thienyl)-1-naphthaleneacetic acid, suitable for use without further purification. The methyl ester of α-methyl-4-(3-thienyl)-1-naphthaleneacetic acid is obtained similarly starting from 5.9 g. of the methyl ester of 4-(3-thienyl)-1-naphthaleneacetic acid.

EXAMPLE 12

A mixture consisting of 5.0 g. of α-n-propyl-5-(2-thienyl)-1-naphthylacetonitrile, 8.0 g. of potassium hydroxide, 20 ml. of water, and 60 ml. of ethanol is heated under reflux for 36 hours, and concentrated to a small volume under reduced pressure. The residue is diluted with water, and the aqueous mixture is extracted twice with ether and acidified with dilute hydrochloric acid. The solid α-n-propyl-5-(2-thienyl)-1-naphthaleneacetic acid that precipitates is isolated and dried.

The α-n-propyl-5-(2-thienyl)-1-naphthylacetonitrile used as starting material in the foregoing procedure is prepared according to the procedure given in Example 11 above for the preparation of the ethyl ester of α-methyl-4-(2-thienyl)-1-naphthaleneacetic acid, with the substitution of 5.13 g. of 5-(2-thienyl)-1-naphthylacetonitrile and 5.84 of n-propyl bromide for the ethyl ester of 4-(2-thienyl)-1-naphthaleneacetic acid and the methyl iodide, respectively.

EXAMPLE 13

A mixture consisting of 38.3 g. of 4-(5-bromo-2-thienyl)-1-naphthaleneacetic acid, 9.5 g. of sodium acetate, 3.0 g. of 20% palladium on charcoal, and 250 ml. of ethanol is shaken at room temperature with hydrogen at a pressure of 51 lbs./in.$^2$ until hydrogen adsorption ceases. The mixture is filtered, the filtrate is concentrated to a small volume under reduced pressure, and the concentrated solution is diluted with water. The solid 4-(2-thienyl)-1-naphthaleneacetic acid that precipitates is isolated, dried, and crystallized from acetonitrile; M.P. 166–168° C.

The same product is obtained in the foregoing procedure when 33.3 g. of 4-(5-chloro-2-thienyl)-1-naphthaleneacetic acid is substituted for the 4-(5-bromo-2-thienyl)-1-naphthaleneacetic acid.

To a solution of 5.34 g. of 4-(2-thienyl)-1-naphthaleneacetic acid in 50 ml. of methanol is added in portions 1.06 g. of sodium carbonate. The mixture is heated under reflux for 30 minutes, and then evaporated to dryness under reduced pressure to give 4-(2-thienyl)-1-naphthaleneacetic acid sodium salt as a white powder.

EXAMPLE 14

A mixture consisting of 44.0 g. of 5-(5-bromo-2-thienyl)-1-naphthaleneacetic acid, 11.0 g. of sodium acetate, 4.0 g. of 20% palladium on charcoal, and 500 ml. of ethanol is shaken at room temperature with hydrogen at a pressure of 52 lbs./in.$^2$ until the uptake of hydrogen ceases. The mixture is then filtered, the filtrate is concentrated to a small volume under reduced pressure, and the concentrated solution is diluted with water. The solid 5-(2-thienyl)-1-naphthaleneacetic acid that precipitates is isolated, dried, and crystallized from benzene-hexane; M.P. 151.5–152.5° C.

The same product is obtained in the foregoing procedure when 38.5 g. of 5-(5-chloro-2-thienyl)-1-naphthaleneacetic acid is substituted for the 5-(5-bromo-2-thienyl)-1-naphthaleneacetic acid.

EXAMPLE 15

A mixture consisting of 5.4 g. of 4-(5-bromo-3-thienyl)-1-naphthaleneacetic acid, 2.3 g. of sodium acetate, 0.5 g. of 20% palladium on charcoal, and 250 ml. of 95% ethanol is shaken at room temperature with hydrogen at a pressure of 51 lbs./in.$^2$ until hydrogen adsorption ceases. The mixture is filtered, the filtrate is concentrated to a small volume, and the concentrated solution is diluted with water. The solid 4-(3-thienyl)-1-naphthaleneacetic acid that precipitates is isolated, dried, and crystallized from ethanol-water; M.P. 119.5–121.5° C.

In the foregoing procedure, with the substitution of 5-(5-bromo-3-thienyl)-1-naphthaleneacetic acid for the 4-(5-bromo-3-thienyl)-1-naphthaleneacetic acid, there is obtained 5-(3-thienyl)-1-naphthaleneacetic acid.

EXAMPLE 16

To a solution of 1.0 g. of 4-(2-thienyl)-1-naphthaleneacetic acid in 10 ml. of acetic acid is added 0.548 g. of sulfuryl chloride, and the resulting solution is stirred and heated under reflux for 2 hours while being irradiated with a floodlight. The solution is then poured into water and the solid 4-(5-chloro-2-thienyl)-1-naphthaleneacetic acid that precipitates is isolated, dried, and crystallized several times from benzene-hexane; M.P. 127–128° C.

By utilizing the foregoing procedure, with the substitution of 1.0 g. of 5-(2-thienyl)-1-naphthaleneacetic acid for the 4-(2-thienyl)-1-naphthaleneacetic acid, there is obtained 5-(5-chloro-2-thienyl)-1-naphthaleneacetic acid; M.P. 138–140° C., following crystallization from cyclohexane.

4-(5-chloro-3-thienyl)-1-naphthaleneacetic acid can also be obtained in the foregoing procedure by substituting 1.0 g. of 4-(3-thienyl)-1-naphthaleneacetic acid for the 4-(2-thienyl)-1-naphthaleneacetic acid.

EXAMPLE 17

A solution of 16.8 g. of bromine in 50 ml. of acetic acid is added dropwise to a solution of 26.8 g. of 4-(2-thienyl)-1-naphthaleneacetic acid in 250 ml. of acetic acid kept at a temperature below 35° C. The resulting mixture is kept at room temperature for one hour and is then poured into water. The solid 4-(5-bromo-2-thienyl)-1-naphthaleneacetic acid that precipitates is collected, dried, and crystallized several times from cyclohexane-benzene; M.P. 138.5–140.5° C.

By utilizing the foregoing procedure, with the substitution of 4-(3-thienyl)-1-naphthaleneacetic acid for the 4-(2-thienyl)-1-naphthaleneacetic acid, there is obtained 4-(5-bromo-3-thienyl)-1-naphthaleneacetic acid; M.P. 156–159° C., following crystallization from benzene-hexane.

To a solution of 6.94 g. of 4-(5-bromo-2-thienyl)-1-naphthaleneacetic acid in 50 ml. of methanol is added in portions 1.06 g. of sodium carbonate. The mixture is heated under reflux for 30 minutes, and then evaporated to dryness under reduced pressure to give 4-(5-bromo-2-thienyl)-1-naphthaleneacetic acid sodium salt as a white powder.

A solution of 1.5 g. of ammonia in 10 ml. of methanol is added to a solution of 6.9 g. of 4-(5-bromo-2-thienyl)-1-naphthaleneacetic acid in 50 ml. of methanol, and the mixture is evaporated to dryness to give 4-(5-bromo-2-thienyl)-1-naphthaleneacetic acid ammonium salt as a white solid. The diethylamine salt is prepared similarly by substituting 3.0 g. of diethylamine for the ammonia.

EXAMPLE 18

A solution of 26.8 g. of 5-(2-thienyl)-1-naphthaleneacetic acid in 250 ml. of acetic acid is kept below 35° C. and irradiated with a floodlight while 7.5 g. of chlorine gas is bubbled into it, and the resulting solution is irradiated at room temperature for one hour more. It is then poured into water, and the solid 5-(5-chloro-2-thienyl)-1-naphthaleneacetic acid that precipitates is isolated, dried, and crystallized several times from cyclohexane; M.P. 138–140° C.

EXAMPLE 19

A solution of 2.7 g. of 4-(2-thienyl)-1-naphthaleneacetic acid in 100 ml. of ethanol containing 10 ml. of concentrated hydrochloric acid is heated under reflux for 18 hours, evaporated under reduced pressure, and the residue is dissolved in ether. The ether solution is washed with saturated aqueous sodium bicarbonate and with water, dried, and evaporated under reduced pressure to give the ethyl ester of 4-(2-thienyl)-1-naphthaleneacetic acid.

In the foregoing procedure, with the substitution of 3.5 g. of 4-(5-bromo-2-thienyl)-1-naphthaleneacetic acid for the 4-(2-thienyl)-1-naphthaleneacetic acid, there is obtained the ethyl ester of 4-(5-bromo-2-thienyl)-1-naphthaleneacetic acid.

EXAMPLE 20

A stirred suspension of 2.0 g. of 5-(2-thienyl)-1-naphthaleneacetic acid, 75 ml. of methanol, 1.0 g. of potassium carbonate and 5 ml. of methyl iodide is heated under reflux for two hours, cooled to room temperature, and stirred with an additional 7 ml. of methyl iodide for one hour. The mixture is poured into water and the aqueous mixture is extracted with ether. The ethereal solution is washed with aqueous sodium bicarbonate and with water, dried, and evaporated under reduced pressure to give a residue of the methyl ester of 5-(2-thienyl)-1-naphthaleneacetic acid.

The same product is obtained by reacting 5-(2-thienyl)-1-naphthalenacetic acid with a slight excess of diazomethane in ether at 15° C.

By utilizing the foregoing procedures, with the substitution of 4-(3-thienyl)-1-naphthaleneacetic acid for the 5-(2-thienyl)-1-naphthaleneacetic acid, there is obtained the methyl ester of 4-(3-thienyl)-1-naphthaleneacetic acid.

EXAMPLE 21

With stirring, 5 g. of the acid chloride of 4-(2-thienyl)-1-naphthaleneacetic acid is added slowly to 75 ml. of ethanol. The reaction mixture is cautiously heated to the boiling point, maintained at reflux for one hour, and then evaporated under reduced pressure to give a residue of the ethyl ester of 4-(2-thienyl)-1-naphthaleneacetic acid.

By utilizing the foregoing procedure, with the substitution of 60 ml. of n-propanol for the methanol, the product obtained is the n-propyl ester of 4-(2-thienyl)-1-naphthaleneacetic acid.

The starting material is obtained as follows. 4-(2-thienyl)-1-naphthaleneacetic acid (20 g.) is added in portions with stirring to 100 ml. of thionyl chloride. When addition is complete, the mixture is cautiously heated to the boiling point and then maintained at reflux for five hours. The excess thionyl chloride is removed by distillation under reduced pressure to yield the acid chloride of 4-(2-thienyl)-1-naphthaleneacetic acid, suitable for use without further purification.

EXAMPLE 22

A mixture of 5.2 g. of the anhydride of 4-(2-thienyl)-1-naphthaleneacetic acid, 50 ml. of ethanol and 10 drops of concentrated sulfuric acid is heated under reflux for four hours, and then evaporated under reduced pressure. The residue is extracted with ether and the ether extract is washed with saturated aqueous sodium bicarbonate and with water, dried, and evaporated under reduced pressure to give the ethyl ester of 4-(2-thienyl)-1-naphthaleneacetic acid.

The starting material is obtained as follows. To a solution of 5.0 g. of 4-(2-thienyl)-1-naphthaleneacetic acid in 50 ml. of methanol is added 1.0 g. of sodium carbonate, the mixture is heated under reflux for 30 minutes, and is then evaporated under reduced pressure to give the solid sodium salt of 4-(2-thienyl)-1-naphthaleneacetic acid. With stirring, a solution of 2.86 g. of the acid chloride of 4-(2-thienyl)-1-naphthaleneacetic acid in 30 ml. of dimethylformamide is added to a solution of 2.9 g. of the sodium salt of 4-(2-thienyl)-1-naphthaleneacetic acid in 30 ml. of dimethylformamide, the resulting mixture is stirred at room temperature for two hours, and is then evaporated under reduced pressure. The residue is extracted with benzene, and the benzene solution is separated, washed with water, dried, and evaporated to give the anhydride of 4-(2-thienyl)-1-naphthaleneacetic acid, suitable for use without further purification.

EXAMPLE 23

A mixture of 13.5 g. of 2-diethylaminoethyl chloride, 26.8 g. of 5-(2-thienyl)-1-naphthaleneacetic acid, and 10.1 g. of triethylamine in 150 ml. of toluene is heated at 100° C. for 24 hours, cooled, and then diluted with ether. Insoluble triethylamine hydrochloride is removed by filtration, and the filtrate is shaken with an excess of dilute hydrochloride acid. The organic phase is discarded, and the acidic aqueous phase is made basic with potassium carbonate and extracted with ether. The ethereal extract is dried and evaporated to dryness to give a residue of the 2-diethylaminoethyl ester of 5-(2-thienyl)-1-naphthaleneacetic acid. The citrate salt is obtained by treating a solution of the free base in methanol with a solution of one equivalent of citric acid in methanol.

By utilizing the foregoing procedure, with the substitution of 34.7 g. of 5-(5-bromo-2-thienyl)-1-naphthaleneacetic acid for the 5-(2-thienyl)-1-naphthaleneacetic acid, the products obtained are the 2-diethylaminoethyl ester of 5-(5-bromo-2-thienyl)-1-naphthaleneacetic acid and its citrate salt.

EXAMPLE 24

A mixture of 14.4 g. of 2-dimethylaminoethyl chloride hydrochloride, 26.8 g. of 4-(2-thienyl)-1-naphthaleneacetic acid, 20.2 g. of triethylamine and 100 ml. of N,N-dimethylformamide is heated at 85–90° C. for 19 hours, cooled, and diluted with ether. Insoluble triethylamine hydrochloride is removed by filtration, and the filtrate is shaken with an excess of dilute hydrochloric acid. The organic phase is discarded, and the acidic aqueous phase is made basic with sodium carbonate and extracted with ether. The ethereal solution is dried and evaporated to dryness to give a residue of the 2-dimethylaminoethyl ester of 4-(2-thienyl)-1-naphthaleneacetic acid. The hydrochloride salt of this ester is obtained by dissolving the free base in ether and treating the ethereal solution with one equivalent of hydrogen chloride.

By utilizing the foregoing procedure, with the substitution of 4-(3-thienyl)-1-naphthaleneacetic acid for the 4-(2-thienyl)-1-naphthaleneacetic acid, the products obtained are the 2-dimethylaminoethyl ester of 4-(3-thienyl)-1-naphthaleneacetic acid and its hydrochloride salt.

EXAMPLE 25

A solution of 28.6 g. of the acid chloride of 4-(2-thienyl)-1-naphthaleneacetic acid and 13.1 g. of 3-diethylamino-1-propanol in 150 ml. of benzene is allowed to stand at room temperature for 18 hours. The mixture is diluted with ether, washed with 0.5 N sodium hydroxide and with saturated sodium chloride solution, dried and evaporated under reduced pressure to give a residue of the 3-diethylaminopropyl ester of 4-(2-thienyl)-1-naphthaleneacetic acid. The hydrochloride salt is obtained by dissolving the free base in ether and treating the solution with one equivalent of hydrogen chloride.

I claim:
1. A compound of the formula

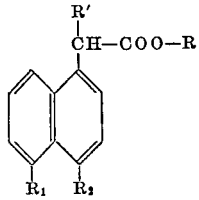

where R is a member of the class consisting of hydrogen, pharmaceutically-acceptable cations, lower alkyl and lower dialkylaminoalkyl; R' is a member of the class consisting of hydrogen and lower alkyl; one of $R_1$ and $R_2$ is hydrogen; and the other of $R_1$ and $R_2$ represents a member of the class consisting of a 2-thienyl substituent of the formula

and a 3-thienyl substituent of the formula

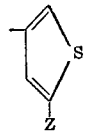

where Z is a member of the class consisting of hydrogen, bromine, and chlorine.

2. A compound according to claim 1 which is 4-(5-chloro-2-thienyl)-1-naphthaleneacetic acid.

3. A compound according to claim 1 which is 5-(5-bromo-2-thienyl)-1-naphthaleneacetic acid.

4. A compound according to claim 1 which is 5-(2-thienyl)-1-naphthaleneacetic acid.

5. A compound according to claim 1 which is 4-(3-thienyl)-1-naphthaleneacetic acid.

6. A compound according to claim 1 which is 5-(5-chloro-2-thienyl)-1-naphthaleneacetic acid.

No references cited.

JOHN D. RANDOLPH, *Primary Examiner.*

C. M. SHURKO, *Assistant Examiner.*